United States Patent [19]

O'Connor et al.

[11] Patent Number: 4,716,408

[45] Date of Patent: Dec. 29, 1987

[54] DATA TRANSMISSION SYSTEM OF THE STAR TYPE WITH ENABLEMENT PASSING

[75] Inventors: Stuart O'Connor, Glossop; Donald Bell, Stockport; Trevor R. Fox, Warrington; Paul Townsend, Middleton, all of United Kingdom

[73] Assignee: International Computers Limited, London, England

[21] Appl. No.: 600,416

[22] Filed: Apr. 16, 1984

[30] Foreign Application Priority Data

Apr. 21, 1983 [GB] United Kingdom ............... 8310821

[51] Int. Cl.$^4$ .............................................. H04Q 1/00
[52] U.S. Cl. .................................. 340/825.5; 370/85; 370/96; 340/825.07
[58] Field of Search .................................... 370/86–90, 370/96, 85, 94, 60, 95; 340/825.01–825.08, 825.5; 375/36, 118; 364/200, 900; 455/607

[56] References Cited

U.S. PATENT DOCUMENTS

| | | | |
|---|---|---|---|
| 4,227,178 | 10/1980 | Gergaud et al. | 364/900 |
| 4,292,623 | 9/1981 | Eswaran et al. | 340/825.5 |
| 4,380,063 | 4/1983 | Junson et al. | 370/60 |
| 4,491,838 | 1/1985 | West | 370/86 X |
| 4,491,946 | 1/1985 | Kryskow, Jr. et al. | 340/825.5 X |
| 4,495,617 | 1/1985 | Ampulski et al. | 340/825.05 X |
| 4,554,673 | 11/1985 | Stevens | 370/86 X |
| 4,568,930 | 2/1986 | Livingston et al. | 340/825.5 |

FOREIGN PATENT DOCUMENTS 0087252 2/1983 European Pat. Off. .
0093004 4/1983 European Pat. Off. .
2406916 5/1979 France .

OTHER PUBLICATIONS

Andrews et al., "A Token-Ring Architecture for Local-Area Networks: An Update", Fall, 1982, 25 *IEEE Computer Society International Conference*.

Cheng et al., "Illinet-A32M Bits/Sec. Local-Area Network", *AFIPS conference Proceedings, National Computer Conference*, May 4-7, 1981.

Albanese, "Star Network with Collision-Avoidance Circuits", *Bell System Technical Journal*, vol. 62 (3/83), No. 3, Part 1, pp. 631-638.

*Primary Examiner*—Ulysses Weldon
*Attorney, Agent, or Firm*—Lee, Smith & Zickert

[57] ABSTRACT

A network provides communication between end units (1). Each end unit (1) received an entitlement to transmit in the form of a go-ahead. It is then able to transmit a frame of user data, which is broadcast by a central unit (7) to all other end units (1). When the end unit (1) transmitting the frame wishes to relinquish its entitlement to transmit it regenerats the go-ahead, which is passed by the central unit (7) to the next end unit (1) taking them in a predtermined cyclic sequence. The system allows frames to be acknowledged: the central unit (7) collects acknowledgements from end units (1) receiving the frame successfully, and when every expected station has acknowledged, returns an acknowledgement to the source end unit (1). Central units (1) may be combined to form larger systems.

11 Claims, 6 Drawing Figures

DATA TRANSMISSION SYSTEM OF THE STAR TYPE WITH ENABLEMENT PASSING

BACKGROUND OF THE INVENTION

This invention relates to data communication systems, especially of the kind that may be used as local area networks or in connecting the elements of data processing systems A local area network allows stations connected by the network to communicate with one another. One problem which must be overcome in any such network is that of contention between stations which wish to transmit simultaneously. One approach is to allow stations to pass an entitlement to transmit from one to another in a predetermined sequence. This approach, which is sometimes referred to as token-passing, has the advantage that it is deterministic, unlike that used in networks of the Ethernet type. Both token-passing rings and token-passing buses have been proposed, and an examole of each is described, together with the Ethernet type, in "Towards a local network standard" by W. Myers in IEEE Micro, Vol. 2 No. 3, August 1982 at pages 28 to 45.

In a token-passing ring data passes successively through every station of the ring that is active and can be modified as it passes. Entitlement to transmit is therefore passed on as a control code, termed a token, which is common to all stations. A station wishing to transmit user data waits until it sees the token, modifies it so it is not seen by subsequent stations, transmits its user data and then regenerates the token to pass on to the next station in the ring.

In a token-passing bus the stations are connected to a common bus and every transmission from any station is received by all other stations unmodified. Tokens are therefore passed on as explicitly addressed messages. The stations are in consequence made more complicated by the need to generate the required addresses and bandwidth is wasted in transmitting them.

The object of this invention is to provide an entitlement-passing system that does not pass data successively through the active stations of the system and yet avoids the need to pass entitlement by explicitly addressed messages.

SUMMARY OF THE INVENTION

According to this invention there is provided a data communication system comprising a plurality of stations between which communication is to take place and coupling means, each station being connected to the coupling means by an inward channel for the transmission of data from the stations to the coupling means and an outward channel for the transmission of data from the coupling means to the station and all the said channels being distinct from those of every other station, each station having means for detecting an entitlement indication received over its inward channel, which indication confers an entitlement on the station to transmit user data, user data being transmitted in frames, and the coupling means comprising: means for retransmitting a frame received over the inward channel from any station onto the outward channels of at least all other active stations, and means responsive to an indication derived from any inward channel that the said entitlement is relinquished by the station connected to that channel to transmit an entitlement indication to a station which is that stations' successor in a predetermined sequence in which each station, at least if active, periodically receives the said entitlement indication, each such indication being transmitted onto the outward channel solely (at least among the active stations) of the said successor station.

Thus user data is sent by the coupling means to all other active stations in parallel, so user data does not pass successively through every active station. On the other hand each entitlement indication is passed by the coupling means only to a single station at any one time, avoiding the need to distinguish the intended recipient by an explicit address.

The invention also provides a coupling element for a data communications system comprising a plurality of ports each comprising an input for connection to an inward channel for transmitting data to the coupling element and an output for connection to an outward channel for transmitting data from the coupling element, the element comprising means for retransmitting a frame received at any input from the output of at least every other port in a group of ports (the said group including the port at whose input the frame is received) and means responsive to an indication derived from any of the said inputs that an entitlement to transmit has been relinquished to transmit an indication of an entitlement to transmit from a predetermined successor port in a sequence which comprises at least the members of the said group.

It further provides a method of data communication between a plurality of stations, the stations receiving in turn, at least if active, an entitlement indication which indication confers an entitlement on the station to transmit user data, the said entitlement being passed from station to station in a predetermined sequence in such a manner that at least each active station periodically receive the said entitlement, and user data being transmitted in frames each of which is received by all other of the stations, at least if active, in which method each station is connected for data tranmission to a common coupling means, which means is capable of distinguishing between a frame containing user data and an indication provided by a station that the station relinquishes an entitlement to transmit, the coupling means distributes a separate copy of a frame received from any station at least to every other active station and the coupling means in response to receipt of the said indication of relinquishment of entitlement from any station transmits the said entitlement indication, at least among the active stations, solely to a predetermined successor station.

A system in accordance with the invention will now be described in greater detail by way of example with reference to the accompanying drawings, in which FIG. 1 is an overall block diagram of the system in its simplest form;

OVERALL SYSTEM

Figure 1:
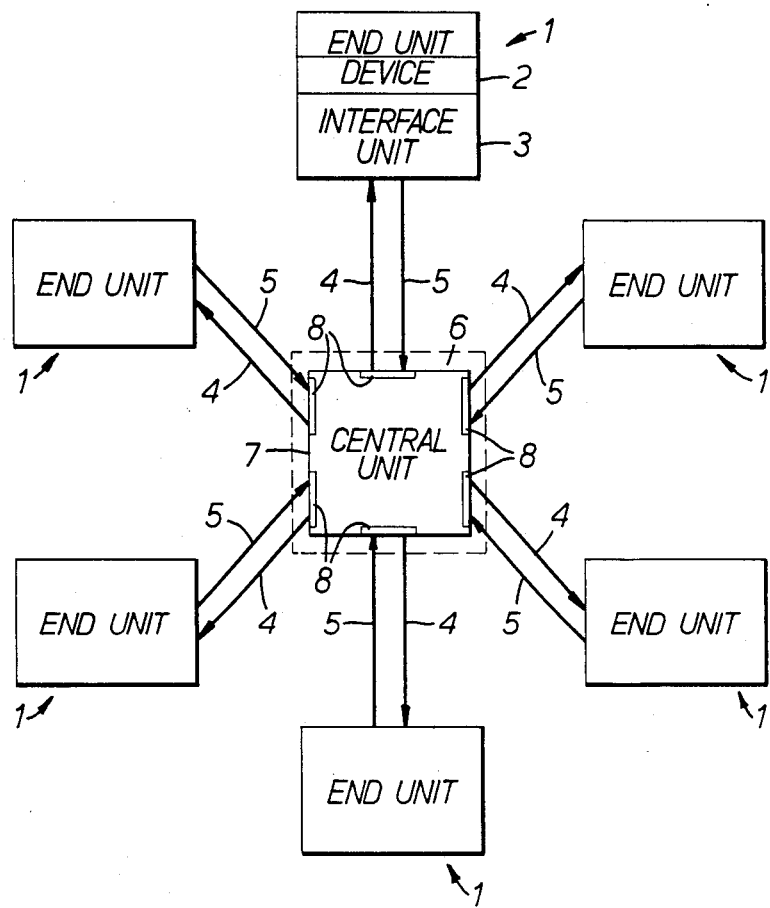

Referring to FIG. 1, the example to be described of a system according to the invention is a local area network allowing a number of end units 1 to communicate with one another as the stations of the network. Each end unit 1 contains a device 2, which, as far as the network is concerned, acts as a source of or destination for user data. The device 2 may, for example, be a computer processor, terminal or peripheral. It may contain the ultimate source or sink of the user data, or may be a device relaying the data to further units; thus it may be a controller attached to a group of peripherals or a gateway to another network.

Each end unit 1 also contains an interface unit 3 which acts as a medium-access control unit for the device 2. The interface unit 3 receives user data from the associated device 2, formulates it into complete frames and regulates their transmission over the network. It also recovers the user data from received frames and passes it to the associated device 2.

Each interface unit 3 is connected by a pair of optic fibres 4 and 5 to coupling apparatus 6 which, in its simplest form, as shown in FIG. 1, consists of a single central unit 7. (Central units may themselves be interconnected, as will be described subsequently.) The optic fibre 4 provides a path for data transmitted outwardly from the central unit 7 to the end unit 1, and the optic fibre 5 provides a path for data transmitted inwardly from the end unit 1 to the central unit 7. Each pair of optic fibres 4 and 5 ends at a port 8 in the central unit.

Transmissions between the end units of the system take place as follows. If a device 2 has data to transmit, its interface unit 3 waits until it receives a special control code which will be termed a go-ahead. The interface unit 3 then has the entitlement to transmit and outputs a frame containing the user data, which is received by the central unit 7 and transmitted by it to every other end unit 1. At the end of the transmission the originating end unit 1 generates and transmits another go-ahead. That is recognised by the central unit 7 as indicating the end of the transmission and the central unit 7 then sends a go-ahead to a further end unit 1. This end unit is the next active end unit taking the active units in a predetermined cyclic (i.e. repeating) order. If it has user data to transmit it does so and the procedure is repeated. If it has none it relinquishes the entitlement to transmit user data by transmitting the go-ahead immediately.

Each active end unit 1 in turn is therefore offered the opportunity to transmit its user data and if it does so its data is received by every other end unit 1. The central unit 7 acts solely as an intermediary in the communication of user data between the end units 1 and is not itself the source or destination of any of the user data. It also acts solely as an intermediary in passing on go-aheads, the responsibility for whose generation lies with the end units.

The user data contains the address of the device or devices for which it is destined, and a device normally accepts data transferred to it only if it recognises its own address or a broadcast address to a group of devices in which it is included.

The system employs a link-level acknowledgement scheme to provide a rapid acknowledgement of the successful receipt of broadcast messages. This scheme is useful, for example, if the system is a multiprocessor configuration and the individual processors wish to be assured that data items they have broadcast to the other processors have been successfully received, so that the processors can rely on all the other processors holding the same version of the item. If an end unit 1 wishes a frame to be acknowledged it indicates as much at the end of the frame and then waits rather than releasing the go-ahead once. Each active end unit taking part in the acknowledgement scheme that successfully receives the frame (because, for example, the frame passes a check for error-free transmission) sends an acknowledgement to the central unit 7. That keeps a record of all end units 1 from which an acknowledgement is expected, and if every such end unit sends an acknowledgement it in turn passes an acknowledgement to the end unit 1 which originated the frame. That unit then releases the go-ahead so that the next end unit 1 can be permitted to transmit. If there is a failure to acknowledge, the originating end unit (which still holds the right to transmit) conducts a recovery procedure before finally releasing the go-ahead.

The central unit 7, though topologically central, may be constructed as a small wall-mounted unit. Each end unit receives a frame at approximately the same time (exactly the same time if the optic fibres are of equal length) and with less delay than later stations on a ring.

Frame format and control codes

A frame transmitted by an interface unit has the following format, in order of transmission:

Start-of-frame; User Data; Frame Check Sequence; End-of-frame.

Start-of-frame and End-of-frame are control codes, described in more detail below.

User Data is supplied by the device 2 and normally contains the source and destination addresses and the actual data item to be transmitted from one device to the other, possibly with control information.

The Frame Check Sequence (FCS) may be a modified cyclic redundancy check of the well-known kind.

Control codes all contain at least six consecutive 1s. To allow them to be distinguished as control codes the user data and frame check sequence are bit-stuffed in the well known manner by the interface unit 3, which counts consecutive 1s in the data and inserts a 0 every time five consecutive 1s are detected. A receiving interface unit 3 removes the inserted 0s.

The various control codes used in the system are as follows, the bits being transmitted least significant (rightmost) bit first:

| | | |
|---|---|---|
| Start-of-frame SOF | 01111110 | 01111110 |
| End-of-frame EOF | 00000000 | 01111110 |
| or | 00011100 | 01111110 |
| Go-ahead GA | 00000000 | 11111110 |
| Acknowledge AK | 00000011 | 11111110 |
| Adjust AK Pattern AAP | 00001111 | 11111110 |

The Start-of-frame and End-of-frame codes both start with the flag pattern 01111110. The final byte of the End-of-frame code will be referred to as the end-of-frame qualifier. It is set to zero by the transmitting end unit 1 if it requires an acknowledgement, and has the non-zero pattern shown if it does not. The use of the Adjust AK Pattern code will be described in more detail subsequently.

Interface unit

Figure 2:
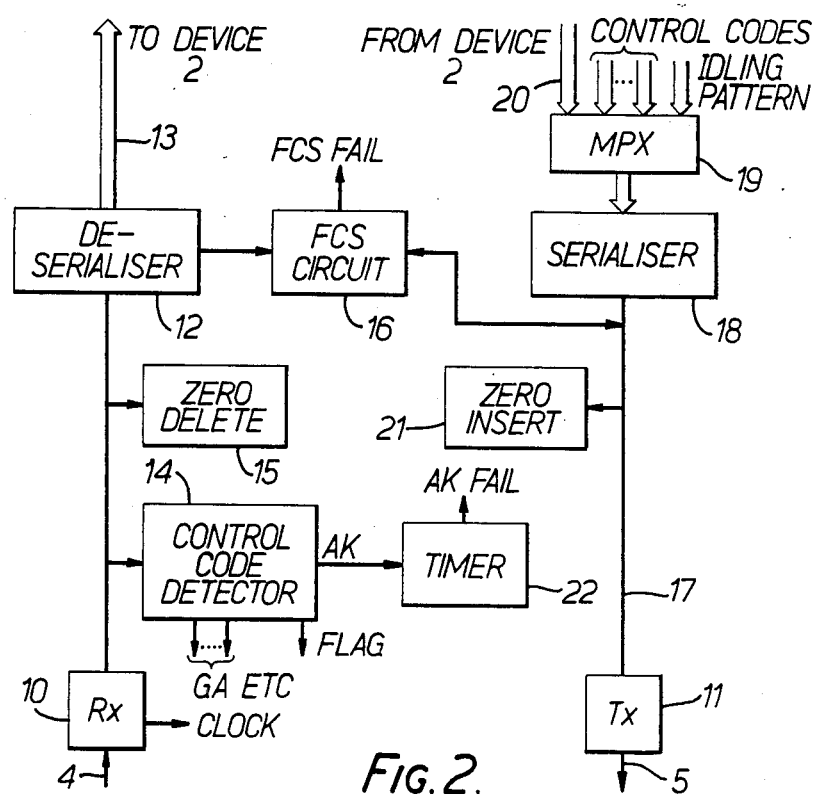
FIG. 2 is a block diagram of an interface unit.

Referring to FIG. 2, at each interface unit 3 the optic fibres 4 and 5 end in a receiver 10 and transmitter 11 respectively. The data is encoded for transmission over the fibres 4 and 5 in a self-clocking format (for example, using phase-encoded Manchester coding) and the receiver 10 extracts the data and clock signals from the received signal. The clock signal is used by the remainder of the interface unit 3.

The received data is supplied to a deserialiser 12 connected by a highway 13 to the attached device. Control codes are detected by a control-code detector 14 which outputs a signal GA etc to indicate the identity of a code it has detected. It also outputs a signal FLAG when the flag pattern is detected at the start of an SOF or EOF code.

A zero delete circuit 15 is responsive to a 0 received after five consecutive 1s to stop the deserialiser 12 and FCS circuit 16 from being clocked for that bit. In this way stuffed bits are removed.

The data entered serially into the serialiser 12 is also output serially, after a delay of one byte, into a frame check sequence (FCS) circuit 16. This delay ensures that when the initial flag of an EOF code is detected it is held in the deserialiser 12 and not entered into the FCS circuit 16. At this point the FCS should hold a predetermined constant. If it does not, a transmission error has occurred and an FCS FAIL signal is output.

The transmitter 11 continuously encodes and transmits the data which it receives from a line 17. Data on the line 17 is normally supplied from a serialiser 18 whose input is selected by a multiplexer 19 to be either a highway 20 from the device 2 or one of the control code patterns or an idling pattern. User data is entered into the FCS circuit 16 from the line 17 and at the end of the data the FCS circuit 16 is unloaded onto the line 17 to add the FCS to the frame. A zero insert circuit 21 counts consecutive 1s during times when a control code is not being output, and if it detects five consecutive 1s it inhibits the clocking out of data from the serialiser 18 or FCS circuit 16 for one bit and thus inserts a 0.

A timer 22 may be started by the interface unit 3. It is used to check that an acknowledgement is returned in due time.

Figure 3:
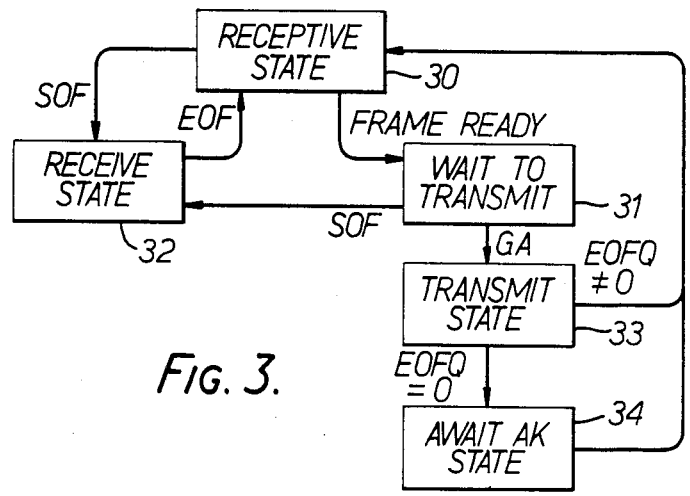
FIG. 3 is a state transition diagram of the interface unit.

The operation of the interface unit 3 will now be described with reference to FIG. 3.

When an end unit 1 becomes active (for example because the device 2 has been switched on) the interface unit 3 enters a receptive state 30. While in the receptive state, and at all times when no user data, control code or FCS is being output, the idling pattern is repeatedly loaded into the serialiser 18 and transmitted onto the optic fibre 5. This pattern consists of zeros interspersed with occasional ones to preserve clock synchronism at the remote end.

If the device indicates that it is buffering a frame ready for transmission the unit enters a waiting-to-transmit state 31; if no frame is buffered, the interface unit 3 monitors the received data for control codes and if it detects an SOF it enters a receive state 2. If it then detects a GA it generates and transmits a GA (indicating that it does not wish to transmit). It ignores any other control code.

In the receive state 32 the interface unit 3 passes the user data from the deserialiser 12 to the device 2, omitting the SOF code. It monitors the received data for the EOF code and when it detects it signals to the device that the frame is ended. The device then discards the FCS, which has been passed to it before the EOF is detected. If the FCS check fails, the interface unit signals to the device that the frame is invalid and should be discarded. (If desired additional checks, such as for example that the size of the frame falls in a prescribed range or that the user data contains an integral number of bytes may also be performed.)

If the EOF qualifier has the specified non-zero value an acknowledgement is not required and the unit returns to the receptive state 30. If the qualifier is zero, an acknowledgement of successful receipt is required and an AK is transmitted provided the FCS and any other checks have not failed. If any check has failed the AK is withheld. In either case the unit then returns to the receptive state 30.

In the waiting-to-transmit state 31 the unit looks for an SOF or GA control code. If it detects the SOF code it enters the receive state 32. If it detects the GA it enters a transmit state 33.

In the transmit state 33 it transmits the frame whose user data was buffered, concluding it with an EOF whose qualifier is zero if it requires an acknowledgement or has the specified non-zero value if it does not. If it does not require an acknowledgement it waits a period T1 sufficient to guarantee a minimum interval between frames received at any end unit, transmits the GA so that the next end unit can be enabled to transmit and returns to the receptive state 30. If it does require an acknowledgement it sets the timer 22 to expire after a time T2 and enters an awaiting AK state 34.

In the awaiting AK state 34 the unit monitors the received data for an AK signal. If none is forthcoming before the timer 22 expires, the device 2 is informed that there has been an AK failure and the responsibility for the action to be taken is passed to higher levels of the protocol situated in the device 2. If AK is received before the timer 22 expires the timer 22 is cancelled, the device 2 is informed and GA is transmitted. In either case the interface unit 3 then returns to the receptive state 30.

The device 2 is capable of commanding its interface unit to make various pre-emptive transmissions regardless of the data being received over the fibre 4, and in particular without waiting for a go-ahead. They are to transmitting a frame containing user data from the device or to transmitting a GA or AAP code. After any of these transmissions the interface unit returns to the receptive state 30.

The devices 2 are responsible for monitoring the network for the loss of a go-ahead. If a device which is waiting to transmit detects that no go-ahead has been received for a predetermined time it transmits a frame pre-emptively. This provides a mechanism to allow a network to be brought into operation initially and to recover from a lost go-ahead.

Central unit

Figure 4:
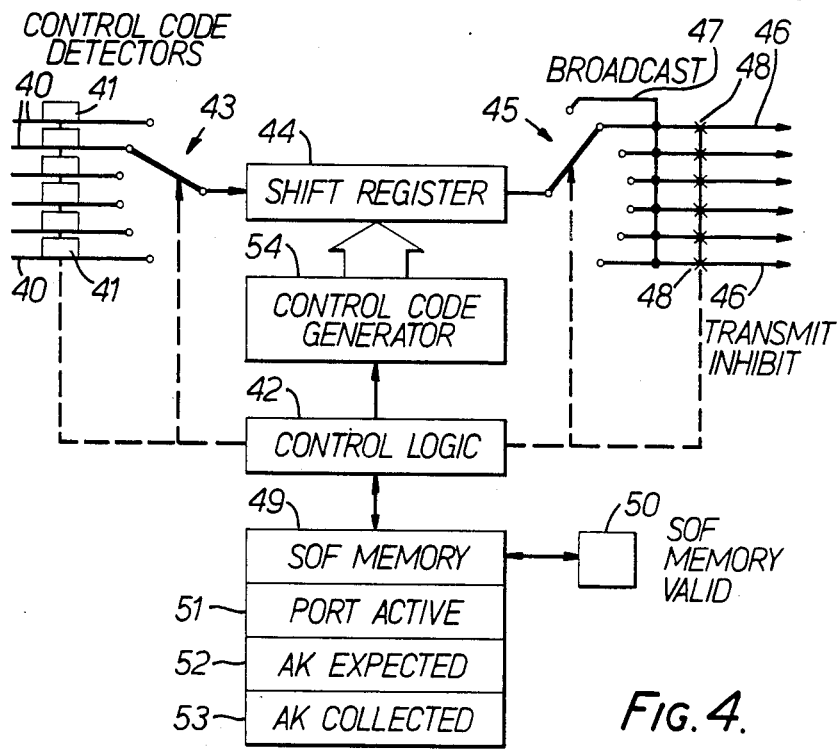
FIG. 4 is a schematic block diagram of a central unit.

Referring to FIG. 4, in outline the central unit 7 receives incoming data on lines 40, one for each port 8. Detectors 41 detect clock and control characters on the various lines 40 and communicate with control logic 42. The lines 40 end at what will be represented, in simplified form, as a switch 43 which connects one of the lines 40 to a shift register 44. That in turn is connected to what will similarly be represented as a switch 45 which can connect the shift register output with any one of a set of lines 46 connected through the various ports 8 to the outward optic fibres 4 to the different end units. Alternatively the switch 45 can connect the shift register output to a broadcast line 47 connected to all the lines 46 except one, which, as represented in FIG. 4, is selected by an inhibit element 48.

The control logic 42 communicates with a number of memories, each of which is an array of bits. Each bit of an array is associated with a different one of the ports 8 of the central unit The arrays are:

An SOF memory array 49: one bit only is set, and indicates that an SOF or AAP has been received from, or a GA is being dispatched from, the corresponding port. If the code concerned was an SOF, an SOF memory valid bistable 50 is set to indicate the fact; otherwise the bistable 50 is put in the unset state on arrival of a control code.

A port active array 51: each bit when set indicates that a clock signal is being detected from the corresponding port.

An AK expected array 52: each bit when set indicates that an acknowledgement is expected from the corresponding port.

An AK collected array 53: each bit is set on detection of an AK from the corresponding port.

A control character generator 54 can load the register 44 in parallel under the control of the logic 42 with the flag pattern and other control codes.

The operation of the central unit 7 in passing go-aheads and frames will now be described, starting at the point at which one of the detectors 41 detects a go-ahead from the port to which it is connected. In response to this detection the SOF memory array 49 is set to indicate the next active port and and the switch 45 is set so that the shift register 44 output is connected to the output line 46 to that port. The go-ahead code is loaded into the shift register 44 from the control-code generator 54 and the go-ahead is dispatched to the port indicated by the SOF memory array 49.

It will be realised that the position of the switch 43 when the go-ahead arrives is immaterial. The central unit can therefore cope with the arrival of go-aheads at any point, for example at initialisation when it has no knowledge of the port from which it is expected.

When an end unit 1 sends a frame the initial flag is detected, the SOF memory array 49 is set to indicate the port concerned and the SOF memory valid bistable 50 is marked valid (i.e. is set). The flag character is written into the shift register 44, the switch 43 is set to connect the port concerned to the input of the shift register 44 and the switch 47 set to connect its output to be broadcast, with the output line 46 to the source port inhibited. Thus the remainder of the frame follows the flag inserted into the shift register, and each other end unit will receive the full frame.

Again, the initial setting of the switch 43 is immaterial, so frames will be dealt with whichever unit they arrive from. Thus pre-emptive frames will be distributed.

When EOF arrives its initial flag will cause the central unit to act in the same way as described for SOF, but the frame as seen by the other end-units and the state of the central unit 7 are not affected thereby.

If an end unit 1 becomes active, clock will be detected at the corresponding port. The corresponding bit of the port active array 51 is set and from then on go-aheads are steered to that end unit. If an end unit 1 ceases to be active its bit of the port active array 51 is cleared and it is thereafter by-passed by go-aheads.

Acknowledgements

When an SOF is detected, as well as the appropriate bit of the SOF memory array 49 being set, the AK collected array 53 is prepared for acknowledgement of the frame in case that is required. For every port except that at which the SOF is received the corresponding bit in the AK collected array 53 is cleared to the unset state if (and only if) the corresponding bit of the AK expected array 52 is set. The bit in the AK collected array 53 corresponding to the port at which the SOF is received is made equal to its bit of the AK expected array 52.

If acknowledgement of the frame is required, it has EOF qualifier of zero. Each active end unit 1 taking part in the acknowledgement scheme then sends an acknowledgement control code AK if it receives the frame successfully. (We shall assume for the present that all end units are taking part in the scheme and explain subsequently the effect of including some end stations which do not carry out acknowledgements.) The AK code is detected in the central unit and the corresponding bit in the AK collected array 53 is set.

The bit in the AK collected array 53 corresponding to the originating unit is already set equal to the bit in the AK expected array 52, since it is so set at the start of the frame, specifically to allow for the fact that no AK is returned by the originating end unit 1. When the AK collected array 53 matches the AK expected array 52 in every bit, and provided the SOF memory valid bistable 50 is marked valid, an AK is loaded into the shift register 44 and the switch 45 is set to connect the shift register 44 to the port indicated by the SOF memory array 49. At this point this array identifies the port at which the frame was received. The AK is then output from that port and sent to the originating end unit 1. After the AK has been sent the SOF-memory valid bistable 50 is marked invalid, so only a single AK can be sent (preventing multiple AKs is the purpose of this bistable).

If an end unit 1 detects a transmission error it withholds its AK. The AK collected array 53 will then never match the AK expected array and no AK will be sent to the originating unit, which will detect the failure when its timer 22 expires. Similarly, if an AK is received from an unexpected station it will also cause an AK failure, since the arrays will not match. Such an AK is written in the AK collected array 53 and is not cleared in response to an SOF, to ensure that a failure results and is reported.

Now consider what happens if there is a change in the number of active units. If a unit becomes active, besides its bit of the port active array 50 being set, its bits of the AK expected and collected arrays 52 and 53 are cleared to the unset state. Then, when it first acknowledges a frame, an AK failure will result. If any unit ceases to be active its bit of the AK collected array 53 is cleared to the unset state (in case it had already been set) and again an AK failure will result.

When an AK failure occurs it is the responsibility of the end unit 1 originating the frame which led to the failure to conduct a recovery procedure. The first stage is to repeat the frame pre-emptively up to a prescribed maximum number of times in the hope that the failure resulted from a transient error that will correct itself. The frame is marked as a repeat to ensure that units which have already received it are not misled. If the originating unit receives an AK, the fault has been recovered from and it re-emits the go-ahead. But if each of these frames leads to an AK failure the originating unit assumes that a unit has become inactive (or one of the links to it has broken down) or a new unit has become active.

The originating unit now enters rhe next stage of the recovery procedure. First it sends a dummy frame addressed to itself (so no other end unit is affected by it) and requiring an acknowledgement, AKs are therefore drawn from all active end units and the AK collected array 53 holds an up-to-date record of the currently active end units the status of the source being entered in the AK collected array 53 in response to the start of the dummy frame). Then the originating unit sends the Adjust AK Pattern code AAP.

When the central unit 7 receives the AAP it responds by copying the contents of the AK collected array 53 into the AK expected array 52. The AK expected array has therefore been updated to hold all the currently active end units. The AAP control code is also loaded into the shift register 44 and broadcast from all ports except that originating it. These codes are ignored by end units and have no effect in the form of the system shown in FIG. 1; they are used when central units are interconnected.

Once the AK expected array 52 has been updated the end unit that originated the AAP enters higher levels of the recovery procedure and polls each end unit individually requiring it to respond pre-emptively. It thus discovers what end units are now present and it informs the other end units 1 accordingly. Finally it releases the go-ahead. It will be noted that while in receipt of the go-ahead it has not only transmitted itself but controlled transmissions over the network by other end units.

It is possible for end units not to take part in the acknowledgement scheme. Such a unit will not cause an AK failure on becoming active or inactive and will not be entered into the AK expected array even when active. But the presence of such a unit will not prevent the mechanism described from operating to ensure that end units which do send AKs cannot become active or inactive without causing a corresponding change to be made in the AK expected array. In a system with both processors and peripherals it might be desired, for example, that the processors should send AKs and the peripherals should not.

The higher levels of the protocol, such as that with the responsibility for dispatching AAPs are located in the device 2 and may be implemented, as is well known, either in special-purpose hardware or by program control.

The ability to acknowledge multiple receipt of broadcast frames is an important distinction from token-passing systems known hitherto.

Port logic

Figure 5:
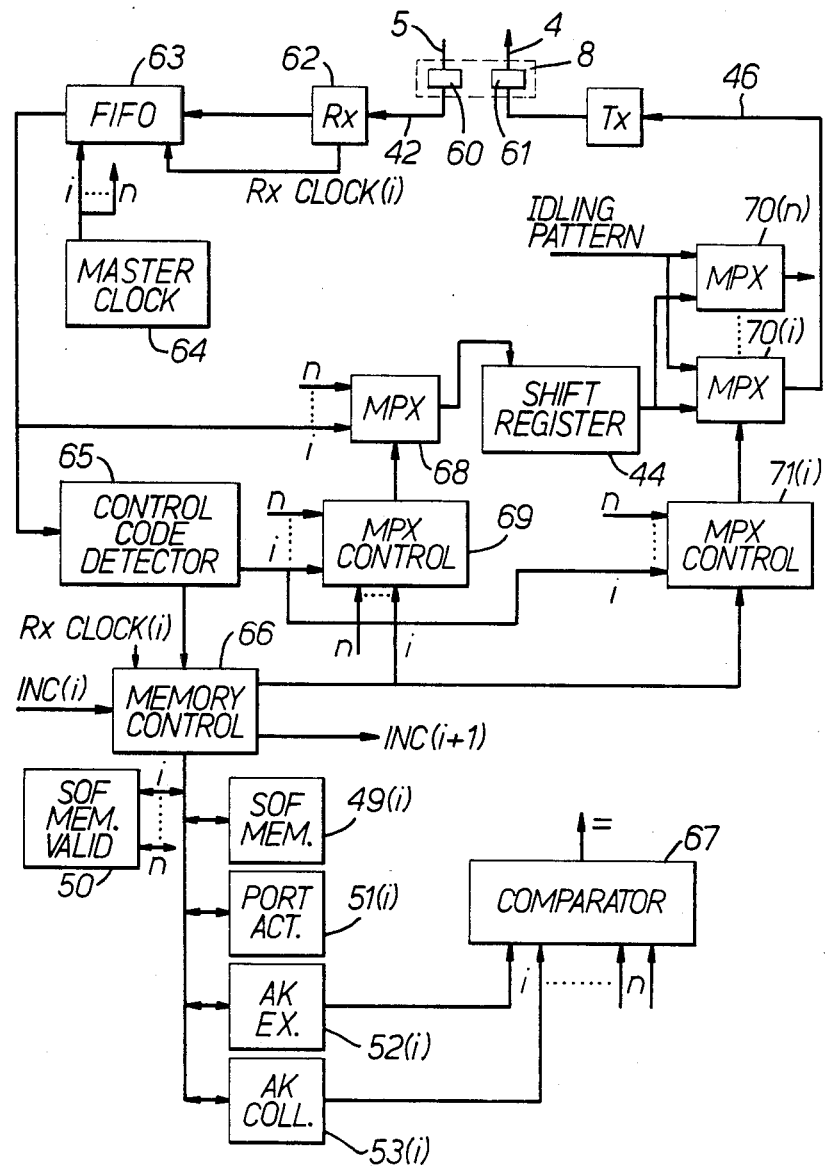
FIG. 5 shows various elements of the central unit, especially those pertaining to a single port, in more detail.

The construction of the central box will now be described in greater detail with reference to FIG. 5, which shows various elements specific to one of the ports 8, together with some of the common elements. The port concerned is assumed to be the ith, and where necessary elements specific to it are distinguished with an i from elements specific to other ports, the letter n being used to distinguish a representative element from another port.

Each port 8 is physically embodied in two optic fibre connectors, a connector 60 for the inward fibre 5 and a connector 61 for the outward fibre 4. Each connector 60 is connected to a receiver 62 which recovers from the received signal both a received clock signal RX CLOCK and the data signal. The data is clocked into a first-in first-out buffer 63 by the received clock signal and is clocked out again by a clock signal from a master clock 64 used throughout the central unit 7. The data is now resynchronised to the clock 64, which acts as a master for the whole network.

Each port has a control-code detector 65 which, whenever it detects a control code, indicates to a memory control circuit 66 which code has been received. The control circuit 66 can set or unset four bistables 49(i), 51(i), 52(i) and 53(i), which hold the bits corresponding to the ith port of the four arrays 49 and 51 to 53. It receives the output of these bistables, an increment signal INC(i) produced by the logic associated with the preceding port 8 in the cyclic order and the recovered clock signal. The control circuit 66 sets or clears the bits 51(i), 52(i) and 53(i) in response to the receipt of control codes and the detection of the received clock signal in the manner already explained. It sets the SOF memory bit 49(i) either in response to receipt of a flag or an AAP or, as long as the port-active bit 51(i) is set, in response to the INC(i) signal. If the port-active bit 51(i) is not set when INC(i) is received, a signal INC (i+1) is passed to the logic of the next port 8 in the cyclic sequence. INC (1+i) is also generated when GA has been detected at the ith port. The INC signals ensure that when a go-ahead is detected at a port a signal is steered to the next active port to set its SOF memory bit. When the SOF memory bit for a port is set the remaining bits of the SOF memory array are cleared.

The memory control circuit 66 can also, in common with the corresponding circuits of the other ports, set or unset the SOF memory valid bistable 50, whose output they receive.

The memory control circuit 66, like the other control circuits of the system, is constructed of standard digital logic elements to carry out the functions described. As the construction of these circuits will be obvious to the man skilled in the art they will not be further elaborated.

The AK collected bit 53(i) and the AK expected bit 52(i) are supplied to a comparator 67 together with the outputs of the corresponding pairs of bits associated with the other ports 8. When the two bits of each pair equal one another the comparator 67 issues an equality signal in response to which the AK signal is returned to the end unit 1 originating the frame.

What has been shown as the input switch 43 to the shift register 44 is implemented as a multiplexer 68 which selects between the input lines 40 of the various ports under the control of a multiplexer control circuit 69. This circuit is enabled by the detection of a flag or AAP to select the line 40 corresponding to the position of the set SOF memory bit.

What has been shown as the output switch 45 from the shift register 44 is implemented as a set of multiplexers 70 each of which selects between the output of the shift register 44 and the idling pattern under the control of its own control circuit 71. The output of each multiplexer 69 is connected to the output line 46 for the corresponding port, which passes to a transmitter 72 and then the optic connecter 61.

Each control circuit 71 selects one of the inputs to its multiplexer 70 according to the srate of its SOF memory bit and the control code received. For a flag and AAP the transmission must be broadcast from all ports 8 except the source. So the shift register output is selected for all ports 8 except the one with the SOF memory bit set, which receives the idling pattern. For a GA or for returning an AK the shift register output is selected only for the port 8 with the SOF memory bit set.

As has been explained, when the initial flag of the SOF is detected at the start of a frame the flag pattern is loaded into the shift register 44 and the data from the originating unit is switched to pass through the shift register 44. The flag is in fact loaded into the final eight bits of the shift register 44 and the data from the switch 43 (i.e. multiplexer 68) is entered into it at the eighth bit, although the register itself is longer to accommodate the other control codes with which it must be loaded. When the later flags in a frame—the second flag of an SOF or the first flag of an EOF—are detected the central unit reacts in the same way as for the initial flag of the frame and loads a flag pattern into the shift register 44. However, this pattern simply replaces the flag pattern already introduced and causes no noticeable change for the receiving units. The other operations resulting from the detection of the later flags in a frame duplicate those that have taken place following the initial flag and also do not affect the situation.

After the control-code generator has loaded a GA, AK or AAP into the shift register 44 it repeatedly loads the idling pattern to ensure that the unit or units connected to receive the output of the shift register 44 can continue to maintain clock synchronism.

Interconnected central units

Figure 6:
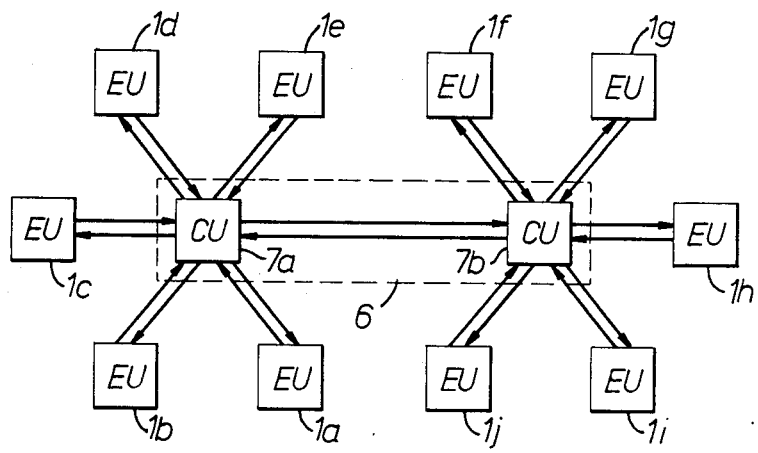
FIG. 6 is an overall block diagram of another form of the system.

To form networks with more end units 1 than a single central unit 7 can accommodate, central units 7 each like the one described may be interconnected port to port. The simplest expansion is shown in FIG. 6, in which "end unit" and "central unit" are abbreviated as EU and CU respectively. It has two central units 7a and 7b with each connected to the other as though it was one of the other's end units.

The central units do not distinguish in their logical operations between the two types of units connected to them—they react in the same way to signals from another central unit as they do to signals from an end unit. This desirable property is a consequence of the structure chosen for the control codes, namely the fact that an end unit returns a go-ahead is the same form as it receives it, and the fact that a central unit forwards control codes in the same form as it receives them. Thus, assuming each central unit sends go-aneads from its ports taking them in a clockwise sequence, the central unit 7a will invite each end unit 1a to 1e to transmit in turn and then pass a go-ahead to the other central unit 7b, which will invite the end units 1f to 1j to transmit in turn and then return a go-ahead to the central unit 1a. The frames themselves are distributed by the central units so that they reach all end units.

If an end unit, 1c say, sends a frame requiring acknowledgement, the further central unit 7b will collect AKs from its end units and when it has received them from each expected end unit it will return an AK to the nearer central unit 7a. That will treat this AK merely as one of those it is expecting and if the remainder arrive it will return an AK to the end unit 1c.

If now an acknowledging end unit, say the end unit 1h, ceases to be active there will be an AK failure. In the recovery procedure the end unit 1c sends a dummy frame requiring acknowledgements. This frame draws an AK from each acknowledging active end unit to its central unit 7a or 7b. However, the farther central unit 7b does not send an AK to the nearer central unit 7a since it detects an AK failure. The end unit 1c now transmits AAP. The farther central unit 7b sets its AK expected array 52 to expect AKs from each active acknowledging end unit but not the end unit 1h. But the nearer central unit 7a sets not to expect an AK from the farther central unit 7b since that did not previously acknowledge. To correct this situation, the end unit 1c sends a further dummy frame, which draws an AK from the farther central unit 7b, and then AAP, which causes the AK expected array 52 of the nearer central unit 7a to be set correctly.

From the point of view of the end units 1 the central units 7a and 7b form coupling apparatus 6 which acts exactly like a single central unit in normal operation except that some time delays are slightly increased. The network of central units in the coupling apparatus 6 may be extended by adding extra central units 7 provided it remains linear or branching—any loop in this network will prevent the system operating correctly. End units need to take account of the structure of the coupling apparatus 6 only when adjusting AK patterns. Each end unit must send a dummy-frame/AAP pair for each central unit in the longest chain radiating from it. A convenient simplification is to make each end unit always send the number of dummy-frame/AAP pairs corresponding to the maximum allowable size of the network.

In the arrangement of FIG. 6 only one of the central units—7a, say—can have a master clock. The clock 64 of the other central unit 7b must follow it as a slave, being synchronised to the received clock on its inward fibre from the central unit 7a. The clocks 64 of any further central units will be similarly slaved.

Modifications

Various modifications of the system described with reference to the drawings are possible. For instance an end unit need not use the same GA code as it receives to inform the central unit 7 to which it is attached that it has finished transmitting, or does not wish to transmit. For example, the end unit may remain silent if it does not wish to transmit. The central unit then receives its indication of the fact that the unit does not wish to transmit in the form of a time-out. Go-aheads may then be sent even to inactive end units. However, such changes require a more complicated central unit.

The data channels may be multiplexed along a common physical link at the cost of greater complexity in the receiver/transmitter structure.

In the system described, all end units that acknowledge do so for all messages requiring an acknowledgement unless they detect a transmission error. However, a device may be able to send a do-not-acknowledge signal to its interface unit that prevents an AK being sent. This signal may be asserted, for example, if the device has insufficient buffering at any instant to accept a frame. This signal may also be used to allow an end unit to contract out of the acknowledgement scheme by asserting the do-not- acknowledge signal permanently or semi-permanently. Changing from an acknowledging to a non-acknowledging state or vice-versa will lead to an AK failure and discovery of the change.

While in receipt of the go-ahead an end unit may be entitled to transmit more than one frame, for example being allowed to transmit frames starting up to an allotted maximum time period.

The go-ahead may be modified to indicate a priority. In that case an end unit will be entitled to accept the invitation to transmit represented by the go-ahead only if it has a frame of equal or greater priority waiting. Changing the level of priority of the go-ahead is then the responsibility of the end units.

It is also possible, e.g. by assigning selected end units more than one bit in the SOF memory array, to ensure that units occur more than once in the cyclic order of end units and receive more go-aheads than other units.

As described, a go-ahead causes the SOF memory array to be set straight away to indicate the next active port. But if desired it may set the bit of its own port, the SOF memory array then being incremented as a whole similarly to a ring counter until it indicates the next active port.

In the system described, if an end unit becomes active and happens to be the one whose AK arrives last at the central unit to which it is connected, its presence will not be detected the first time it acknowledges since the AK collected and expected arrays 53 and 52 will match, and the AK will be dispatched from the central unit 7, before the AK from the new station arrives. But its bit of the AK collected array 53 will be set, in disagreement with its bit of the AK expected array 52, and an AK failure will occur at the next frame provided the frame does not come from the newly active unit. If it does, higher layers of the protocol used will allow the other end units to detect its presence. But if this procedure is not regarded as satisfactory, a timer may be introduced in the central unit which withholds the return acknowledgement until all end units have had time to respond with an acknowledgement.

We claim:

1. A data communication system comprising a plurality of stations between which communication is to take place and coupling means, each station being connected to the coupling means by an inward channel for the transmission of data from the station to the coupling means and an outward channel for the transmission of data from the coupling means to the station, the channels of each station being distinct from those of every other station, each station having means for detecting an entitlement indication received over its inward channel, which indication confers an entitlement on the station to transmit user data, user data being transmitted in frames, the stations being in a predetermined cyclic sequence in which each station has a successor station, and the coupling means comprising:

means responsive to receipt of a frame over the inward channel from any station for retransmitting that frame on to the outward channels of the other stations, whereby the frame is broadcast to those other stations, and means responsive to receipt of an indication from any station, indicating that the station is relinquishing its entitlement to transmit user data, for transmitting an entitlement indication solely on to the outward channel of that station's successor station.

2. A system as claimed in claim 1 in which said means for retransmitting a frame comprises means for coupling the inward channel from which the frame is received to the outward channels of the other stations.

3. A system as claimed in claim 1, in which each station has means for outputting, and the coupling means is responsive to, a control code as the said indication that a station relinquishes the said entitlement.

4. A system as claimed in claim 3, in which the means in the coupling means for transmitting the entitlement indication outputs that indication as the same control code as indicates relinquishment of entitlement.

5. A coupling element for a data communications system comprising a plurality of ports each comprising an input for connection to an inward channel for transmitting data to the coupling element and an output for connection to an outward channel for transmitting data from the coupling element, the element comprising means for retransmitting a frame received at any input from the output of every other port in a predetermined group of ports the said group including the port at whose input the frame is received and means for transmitting, on receipt of an indication derived from any of the said inputs that an entitlement to transmit has been relinquished, an indication of an entitlement to transmit from a predetermined successor port in the said group.

6. A coupling element as claimed in claim 5 in which said means for retransmitting a frame comprises means for coupling the input at which the frame is received to the outputs of each of said predetermined group of ports.

7. A coupling element as claimed in claim 5, which is responsive to a control code as the indication that entitlement is relinquished.

8. A coupling element as claimed in claim 7, in which the means for transmitting the entitlement indication outputs that indication as the same control code as indicates relinquishment of entitlement.

9. A system comprising a coupling element as claimed in claim 5 in combination with a plurality of stations each connected by a pair of channels to one of the said ports.

10. A system comprising a plurality of coupling elements each as claimed in claim 5 and connected port-to-port into a non-looping network, the said plurality being in combination with a plurality of stations each connected by a pair of channels to a port of one of the said elements which port is not connected to another of the said elements.

11. A method of data communication between a pluraltiy of stations, the stations receiving in turn an entitlement indication which indication confer an entitlement on the station to transmit user data, the said entitlement being passed from station to station in a predetermined sequence in such a manner that each of the said stations periodically receives the said entitlement and user data being transmitted in frames each of which is received by all other of the said stations in which method:

each station is connected for data transmission to a common coupling means, which means is capable of distinguishing between a frame containing user data and an indication provided by a station that it relinquishes an entitlement to transmit, the coupling means distributes a separate copy of a frame received from any station to every other of the said stations, and the coupling means on receipt of the said indication of relinquishment of entitlement from any station transmits the said entitlement indication solely to a predetermined successor station among the said stations.

* * * * *